United States Patent Office.

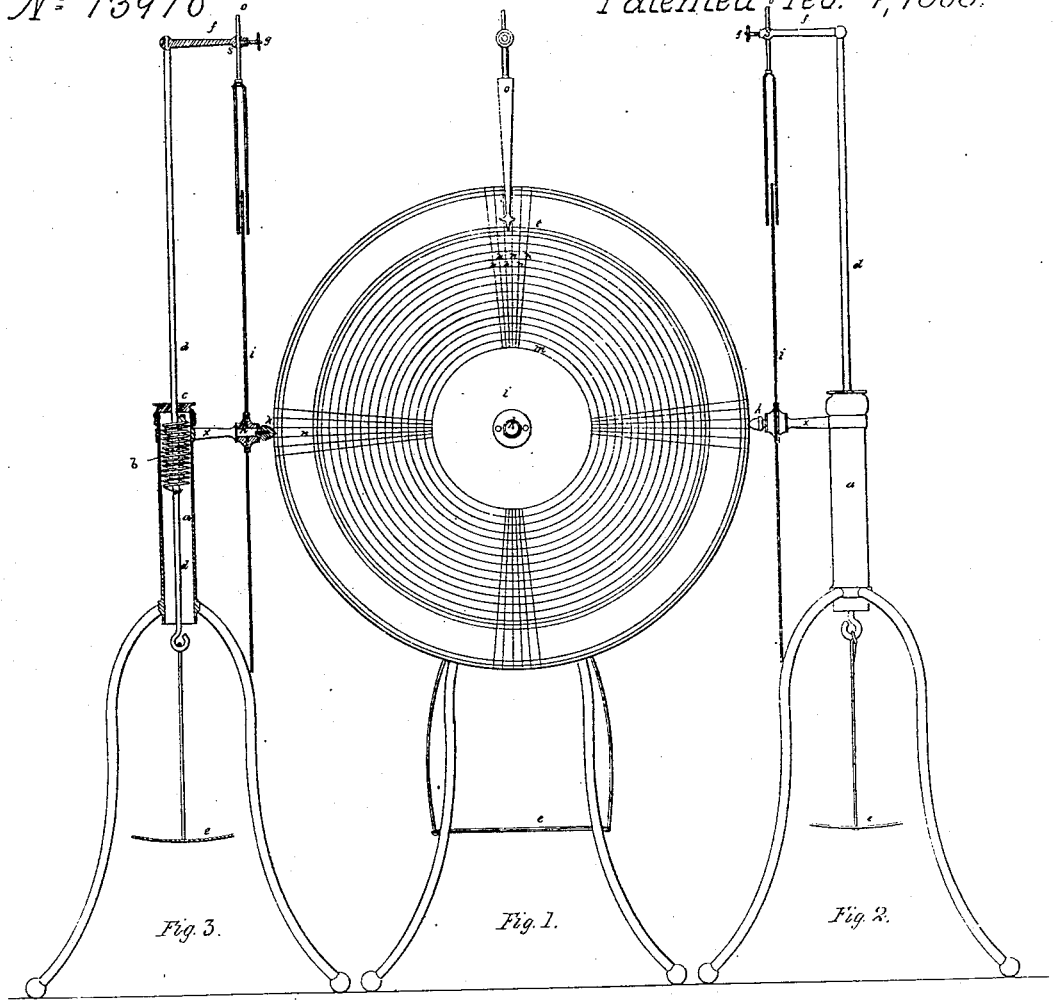

MARCUS L. M. HUSSEY, OF NEW YORK, N. Y.

Letters Patent No. 73,976, dated February 4, 1868.

---

IMPROVEMENT IN POSTAL SCALES.

---

The Schedule referred to in these Letters Patent and making part of the same.

---

TO ALL TO WHOM THESE PRESENTS MAY COME:

Be it known that I, MARCUS L. M. HUSSEY, of the city of New York, in the county and State of New York, have invented a new and useful Scale for Postal and other Purposes, and that the following is a full and exact description thereof, reference being had to the drawing herewith accompanying.

Figure 1 is a front view of my invention,

Figure 2 is a side view of the same, and

Figure 3 is a sectional view thereof.

The object of my invention is to provide a scale which, when used for postal purposes, shall indicate not only the weight of the letter or package submitted to it, but shall also correctly determine the cost of transmitting the said letter or package to any and all countries between which and the United States postal relations may exist, by any and all established mail-routes; and, to enable others skilled in the art to manufacture my invention, I will proceed to describe the same.

Within the tube $a$, which may be mounted upon legs, or suspended from the ceiling, or attached to the wall, I confine the spring $b$, the upper end of which I attach to the cap $c$ of the tube $a$, and the lower end of which spring I fasten to the rod $d$. To the lower end of the rod $d$, I suspend the platform $e$, while to the upper end of said rod is attached the arm $f$, holding the adjustable indicator $o$. This indicator or pointer is rendered adjustable by having its shank passed through the eye $s$, formed in the arm $f$, where it is firmly secured in any desired position by the regulating-screw $g$.

To show more clearly the uses to which this indicator is applied, it is proper to describe the dial represented by the drawings. To the exterior of the tube $a$ there is secured a stud, $x$, terminating in a centre-pin, $h$, which pin projects from the centre of the face of said stud. Centred upon this pin is a revolving dial, $i$, formed of thick paper, metal, or other suitable material, which dial may be held in position by the pressure of the tightening-nut $k$, working upon a screw cut upon the centre-pin $h$.

The dial $i$, when used for postal purposes, may be laid off, on either or both sides, in the following manner: From the inner circle, marked $m$ on the accompanying drawings, are drawn radiating lines $n\ n\ n\ n\ n$, extending from said inner circle to the periphery of the dial. These lines are intersected by circles concentric to the circle $m$. These circles represent the distance travelled by the indicator or pointer $o$, as successive ounces or fractions of ounces are laid on the suspended platform $e$, the movement of the pointer being occasioned by the elongation of the spring $b$ when the weight is applied. Near the periphery of the dial $i$ are two circles, between which, in spaces formed by the radial lines and intersecting circles, is marked the rate of postage on pamphlets and newspapers. Between these two outer circles and the system of circles described as representing ounces and fractions of ounces occurs a space, in which space, and between the radial lines, are marked the names of countries and postal routes, and following these, toward the centre of the dial, there is marked, in the spaces formed by the radial lines and the intersecting circles, the sum required for the payment of letter-postage, as indicated by the movement of the pointer $o$, according to the amount of weight placed on the platform $e$.

The pointer or indicator $o$ is constructed of metal, or other suitable material, and may be made in the form of a fork, with one prong of said fork passing on either side of the dial $i$, when said dial is arranged with lines, circles, and names of countries and routes on both sides thereof, or may be made with a single point when one face only of said dial is so arranged, the point or points terminating, when no weight is on the platform, precisely at the first or outer circle, $t$, of the system of circles described as representing ounces and fractions of ounces. The upper end of this double or single pointer or indicator $o$ terminates in a rod or shank, which passes through the eye $s$, in the arm $f$, where it is secured by the set-screw $g$, and readily adjusted to exactly meet the line $t$, in case of a derangement of the spiral spring $b$, by contraction or expansion under a varying temperature, or from any other cause, it having been found in practice that, when the scale is balanced, with the point at the line $t$, the pointer will indicate with absolute accuracy, throughout the entire system of circles, the weight applied.

The necessity for a dial, with its multitude of diverging lines, in connection with the other features of this device, is occasioned by the very large number of countries with which the United States maintains postal relations, and the still larger number of postal routes having varying rates of postage. For postal purposes, therefore, the dial is deemed indispensable. For ordinary weighing purposes, however, a section or segment of the dial may be employed, upon which, in contiguous radiating lines, may be indicated, by appropriate intersecting lines, the minute subdivisions of troy, apothecaries', and avoirdupois weight.

What I claim as new, and desire to secure by Letters Patent of the United States, is—

1. The revolving dial $i$, upon which are inscribed mail-routes and postal rates, substantially as described and for the purposes specified.

2. The combination of the revolving dial $i$, upon which are inscribed postal rates and mail-routes, with the spring, or other equivalent weighing-balance, substantially as and for the purpose described.

3. The combination of the dial $i$, or a segment thereof, with the adjustable indicator $o$, when constructed substantially as described.

4. The vertical indicator, when used in connection with a revolving dial, or a segment thereof, for the purposes specified.

5. The vertical indicator, in connection with a spiral-spring balance, for the purposes specified.

MARCUS L. M. HUSSEY.

Witnesses:
  EDM. F. BROWN,
  FRANK FULLER.